United States Patent
Sridhar et al.

(10) Patent No.: US 12,218,851 B2
(45) Date of Patent: Feb. 4, 2025

(54) SYSTEM AND METHOD FOR CALIBRATION OF TRAFFIC FLOW ACCELERATION

(71) Applicant: Sandvine Corporation, Waterloo (CA)

(72) Inventors: Kamakshi Sridhar, Plano, TX (US); Tushar Mulkar, Karnataka (IN); Akash Manchanhalli Suresh, Bangalore (IN); Nilanjan Sarkar, Karnataka (IN)

(*) Notice: Subject to any disclaimer, the term of this patent is extended or adjusted under 35 U.S.C. 154(b) by 208 days.

(21) Appl. No.: 17/704,670

(22) Filed: Mar. 25, 2022

(65) Prior Publication Data

US 2023/0308397 A1    Sep. 28, 2023

(51) Int. Cl.
*H04L 47/27* (2022.01)
*H04L 47/12* (2022.01)

(52) U.S. Cl.
CPC ............. *H04L 47/27* (2013.01); *H04L 47/12* (2013.01)

(58) Field of Classification Search
None
See application file for complete search history.

(56) References Cited

U.S. PATENT DOCUMENTS

| | | | | |
|---|---|---|---|---|
| 2005/0144303 A1* | 6/2005 | Zhang | ............... | H04W 36/0011 709/231 |
| 2007/0223395 A1* | 9/2007 | Lee | .................. | H04W 8/04 370/465 |
| 2007/0223492 A1* | 9/2007 | Lee | .................. | H04W 28/18 370/395.52 |
| 2009/0303877 A1* | 12/2009 | Park | .................. | H04L 41/0896 370/231 |
| 2010/0246398 A1* | 9/2010 | Chiang | .................. | H04L 47/27 370/252 |
| 2013/0114408 A1* | 5/2013 | Sastry | .................. | H04L 47/37 370/231 |
| 2016/0323194 A1* | 11/2016 | Lee | .................. | H04L 45/38 |
| 2018/0338264 A1* | 11/2018 | Kim | .................. | H04L 69/163 |

(Continued)

FOREIGN PATENT DOCUMENTS

| | | | |
|---|---|---|---|
| CN | 100480711 | * | 4/2009 |
| CN | 107800642 A | | 3/2018 |
| KR | 20070060622 | * | 6/2007 |

OTHER PUBLICATIONS

Extended European Search Report, European Patent Office, on corresponding EP Application No. 23163302.5 dated Aug. 7, 2023.

*Primary Examiner* — Andre Tacdiran
(74) *Attorney, Agent, or Firm* — Amarok IP Inc.; Neil W. Henderson (57) ABSTRACT

A method for calibration of Transmission Control Protocol (TCP) traffic flow acceleration in a computer network, the method including: initializing a maximum congestion window parameter; determining at least one slow start threshold; monitoring the traffic flow within the network; and updating parameters based on the monitored traffic flows. A system for calibration of TOP traffic flow acceleration in a computer network, the system including: an initialization module configured to initialize a maximum congestion window parameter; an analysis module configured to determine at least one slow start threshold; and a monitoring module configured to monitor the traffic flow within the network; and update parameters based on the monitored traffic flows.

18 Claims, 7 Drawing Sheets

(56) References Cited

U.S. PATENT DOCUMENTS

2020/0205026 A1* 6/2020 Li .................. H04W 24/08
2021/0160183 A1* 5/2021 Mindler ............ H04W 40/36
2022/0369153 A1* 11/2022 Manja Ppallan ..... H04W 28/24

* cited by examiner

Fig. 6B Too high max cwnd

BAD - Frequent transitions from congestion avoidance to slow start, results in lower overall throughput and poor QoE Fig. 6D Too high ssthresh1

BAD – There is too long a time before congestion avoidance starts. Too long slow start is conservative and results in poor link utilization Fig. 6A Ideal operation GOOD – since there are very few transitions to slow start Fig. 6C Too low max cwnd BAD – Never entering slow start means lower overall throughput. Thus, the link capacity is not effectively utilized and this will result in poor QoE.

SYSTEM AND METHOD FOR CALIBRATION OF TRAFFIC FLOW ACCELERATION

FIELD

The present disclosure relates generally to computer network traffic. More particularly, the present disclosure relates to a system and method for calibration of Transmission Control Protocol (TCP) traffic flow acceleration.

BACKGROUND

Service Providers, including Internet Service Providers (ISP) as well as content providers, generally try to provide the greatest Quality of Services (QoS) to the greatest number of users given network constraints. As more people access content via online networks, congestion continues to grow. Various congestion control strategies have been used to attempt to improve the Quality of Services (QoS) and the Quality of Experience (QoE) to users on the network.

TCP is one of the main protocols used for online communication. It is a defined standard that is generally used to establish and maintain a network connection by which applications can exchange data over the Internet. Many Internet applications rely on TCP to deliver data to the users of the network. TCP is intended to provide a reliable and error checked traffic stream between a client and a server.

As connectivity speed and reliability of online access increases, any type of congestion or delay for a user tends to be viewed negatively. As such, there is a need for an improved method and system for TCP acceleration.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for calibration of Transmission Control Protocol (TOP) traffic flow acceleration in a computer network, the method including: initializing a maximum congestion window parameter; determining at least one slow start threshold; monitoring the traffic flow within the network; and updating parameters based on the monitored traffic flows.

In some cases, monitoring the traffic flow within the network may include, creating a counter to determine a number of cycles of congestion avoidance: and determining the number of cycles of congestion avoidance without entering a slow start phase of congestion avoidance.

In some cases, the maximum congestion window parameter may be raised once the number of cycles of congestion avoidance has hit a predetermined cycle threshold.

In some cases, monitoring the traffic flow within the network may include, determining whether the traffic flow has entered into a slow start phase; and lowering the maximum congestion window parameter.

In some case, the maximum congestion window may be initialized as a high initial value.

In some cases, three slow start thresholds may be determined.

In some cases, the first slow start threshold may be initialized as a multiple of the maximum congestion window.

In some cases, each slow start threshold may be a multiple of the previous TCP congestion mechanism parameter.

In some cases, once at least one TCP congestion mechanism parameter is updated, each of the other parameters may be updated based on the update of the at least one TCP congestion mechanism parameter.

In another aspect, there is provided a system for calibration of Transmission Control Protocol (TCP) traffic flow acceleration in a computer network, the system including: an initialization module configured to initialize a maximum congestion window parameter; an analysis module configured to determine at least one slow start threshold; and a monitoring module configured to monitor the traffic flow within the network; and update parameters based on the monitored traffic flows.

In some cases, the monitoring module may be configured to: create a counter to determine a number of cycles of congestion avoidance; and determine the number of cycles of congestion avoidance without entering a slow start phase of congestion avoidance.

In some cases, the maximum congestion window parameter may be raised once the number of cycles of congestion avoidance has hit a predetermined cycle threshold.

In some cases, the monitoring module may be configured to: determine whether the traffic flow has entered into a slow start phase; and lower the maximum congestion window parameter.

In some cases, the initialization module may be configured to initialize the maximum congestion window as a high initial value.

In some cases, the analysis module may be configured to determine three slow start thresholds.

In some cases, the first slow start threshold may be initialized as a multiple of the maximum congestion window.

In some cases, each slow start threshold may be a multiple of the previous TCP congestion mechanism parameter.

In some cases, the monitoring module may be configured to update all of the parameters once at least one TCP congestion mechanism parameter is updated.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

In the following, various example systems and methods will be described herein to provide example embodiment(s). It will be understood that no embodiment described below is intended to limit any claimed invention. The claims are not limited to systems, apparatuses or methods having all of the features of any one embodiment or to features common to multiple or all of the embodiments described herein. A claim may include features taken from any embodiment as would be understood by one of skill in the art. The applicants, inventors or owners reserve all rights that they may have in any invention disclosed herein, for example the right to claim such an invention in a continuing or divisional application and do not intend to abandon, disclaim or dedicate to the public any such invention by its disclosure in this document.

Generally, the present disclosure provides a method and system for calibration of Transmission Control Protocol (TCP) traffic flow acceleration. The system is intended to initialize a max congestion window parameter (cwnd) for the TCP congestion mechanism. The system further determines slow start thresholds for the TCP congestion mechanism. The system monitors the traffic flow and congestion levels. The system may further update slow start thresholds and/or the max cwnd depending on the congestion levels of the traffic flows.

Figure 1:
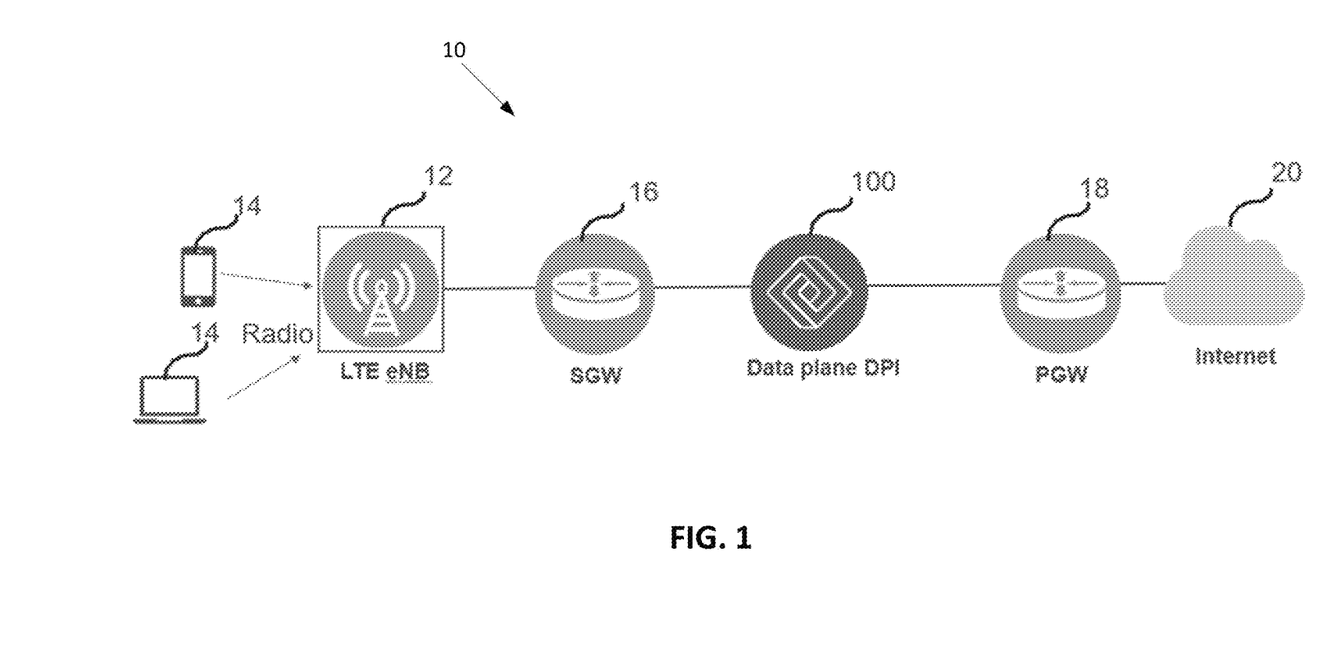
FIG. 1 illustrates a system for authorization of traffic flows according to an embodiment in a network environment.

FIG. 1 shows a diagram of a computer network architecture 10. It will be understood that at least one Evolved Node Base station (eNodeB) 12 resides within a Radio Access Network (RAN) (not shown). The eNodeB 12 is designed to allocate the network resources among the various users and the user devices 14. The RAN is in communication with a core network. The eNodeB 12 connects to the core network via a serving gateway (SGW) 16, which is further in communication with a packet data network gateway (PGW) 18 which is in communication with the Internet 20. The system 100 is configured to be transparent to the users. It will be understood that FIG. 1 illustrates a high level network architecture and that a computer network may include further aspects not illustrated. In some cases, the system may be located on the Internet side of the PGW 18.

A system 100 for calibrating the acceleration of TCP traffic flows is intended to reside in the core network. In particular, the system 100 may be an inline probe north of the PGW 18, between the SGW 16 and PGW 18 (as shown), or in another location where the system is able to access the data noted herein for TCP traffic flows. It will be understood that in some cases the system may be a physical network device or may be a virtual networking device. It will be understood that the system may be used on any IP based networking system, for example, WiFi based, mobile data networks like GPRS, CDMA, 4G, 5G, LTE, satellite based, WLAN based networks, fixed line broadband fiber optic networks as well as on virtual private networks.

From FIG. 1, a server may be contacted through the Internet 20. The server may be a Video server hosting a Transmission Control Protocol (TCP) stack, sending packets over a fixed line network and then to the UE (mobile device) over a radio interface. TCP is a transport layer protocol in the Open Systems Interconnection (OSI) layer that creates a connection between two entities (server and client) by transporting and ensuring the delivery of messages in a reliable manner. TCP works with the Internet Protocol (IP), which defines how computers send packets of data to each other. Together, TCP and IP are the basic rules that define the Internet. TCP is a connection-oriented protocol. A connection is established and maintained until the applications at each end have finished exchanging messages.

TCP protocol is intended to provide the various services:
decide how to segment application data into packets that networks can deliver;
send packets to, and accepts packets from, the network layer;
manage flow control;
handle retransmission of dropped packets to permit error-free data transmission; and
Acknowledge all packets that arrive.

In the Open Systems Interconnection (OSI) communication model, TCP covers parts of Layer 4, the transport layer, and parts of Layer 5, the session layer. TCP operation is intended to ensure the secure transmission between a server and client. TCP is intended to provide guarantees as to the integrity of data sent over the network, even in the presence of congestion. Protocols supported by TCP include the following: Video (HTTP Adaptive Streaming); HTTP; Secure shell and File Transfer Protocol and the like. TCP uses sliding window flow control that allows a larger amount of data "in flight" than has been acknowledged.

A computer network is considered congested when too many packets try to access the same link at the same time. Congestion in the network results in excessive packet delay and dropped packets. With TCP congestion management, the TCP traffic flow adjusts its window size to adapt to the congestion within the network.

Congestion occurs when the rate of flow of packets towards any node is more than the nodes handling capacity. When congestion occurs, the congestion slows down the network response time. As a result, the performance of the network decreases. Congestion occurs because routers and switches have a queue buffer, holding the packets for processing. After the holding process completes, the routers and/or switches pass the packet to the next node, resulting in congestion in the network.

Congestion control is a mechanism that limits the flow of packets at each node of the network. Congestion control is designed to prevent or reduce any node from being overloaded with excessive packets.

A first phase of congestion control may be considered to be a slow start cycle. In the first phase of congestion control, the sender sends the packet and gradually increases the number of packets until the number of packets reaches a threshold. The window size of the threshold is decided by the receiver. Just like in flow control, in slow start there is a window size in the congestion control mechanism. The window size is intended to be increased gradually.

The sender starts sending packets with congestion window size (CWND) of 1 MSS (Max Segment Size). MSS denotes the maximum amount of data that the sender can send in a single segment. Initially, the sender sends only one segment and waits for the acknowledgment for segment 1. After that, the sender increases the window size (CWND) by 1 MSS each time.

The slow start process is not intended to continue indefinitely. The threshold is generally known as the slow start threshold (SSTHRESH). The SSTHRESH terminates the slow start process. When the window size (CWND) reaches the slow-start threshold, the slow start process stops, and the next phase of congestion control starts. In many implementations, the value of the slow start threshold is 65,535 bytes. If the window size increases exponentially, congestion is likely to set in the network.

Congestion Avoidance is the next phase of congestion control. In the slow start phase, window size (CWND) increases exponentially. To avoid the onset of congestion, TCP has a congestion avoidance mechanism. With the congestion avoidance mechanism, after each acknowledgment, TCP ensures the linear increment in window size (CWND), shower than the slow start phase. In the congestion avoidance phase, the rate of incrementing window size (CWND) is decreased in order to reduce the probability of congestion in the network. If there is still congestion in the network, congestion detection mechanism is applied.

Congestion detection is the next phase of the congestion mechanism for TCP traffic. TCP decides that the network is congested under two conditions. First, when there is no acknowledgment received for a packet sent by the sender within an estimated time. In this case, a new slow start phase is started.

The second condition occurs when the receiver gets three duplicate acknowledgments. In this case, a new congestion avoidance phase is started.

The maximum theoretical attainable TCP throughput for a single session varies as a function of Round Trip Time (RTT) and packet loss. For TCP, an important delay metric is the RTT between TCP end-systems. The maximum number of unacknowledged segments that a TCP sender can have outstanding is limited by the window size. Therefore, for a particular RTT between sender and receiver, the maximum possible TCP session throughput can be determined by window_size*MSS/RTT, where MSS is the maximum segment, size. This is the amount of data that has been sent, but not yet acknowledged and is commonly referred to as the TCP "flight size". Hence, the TCP session throughput is inversely proportional to the RTT Reducing the end-to-end delay (also referred to as RTT) will increase throughput. TCP-Accelerator is an entity that aims to maximize throughput delivery to the UE by reducing the delay. The TCP-Accelerator (TCP-A) resides in the data plane DPI entity 100. The TCP-Accelerator is configured to implement the TCP protocol stack at some point in-between the source and the destination. Inserting the TCP-Accelerator and intercepting each flow, the TCP-Accelerator sends. PRE-ACKs back to the sender which then allows the sender to send a sizable number of packets in return. These packets are held in a buffer and delivered to the UE in a controlled manner based on the ACKs sent back to the TCP-Accelerator from the UE. Thus, the end-to-end delay is now primarily reduced to the delay between TCP-A and the UE. This is intended to improve the overall throughput of the network.

One congestion control mechanism used conventionally is TCP New Reno mechanism. The system and method detailed herein are intended to benefit from the New Reno mechanism. Further, the system and method detailed herein are intended to provide an automated initialization of the New Reno mechanism to optimize the congestion management offered by the New Reno mechanism.

Conventionally, the New Reno mechanism is intended to improve the retransmission during of TCP traffic flows. New RENO is generally seen as an improvement with some modification over the previously used congestion mechanism of TCP-RENO. New Reno is able to detect multiple packet losses and thus is much more efficient than RENO in the event of multiple packet losses. Like Reno, New-Reno also enters into fast-retransmit when the mechanism notices that there have been multiple duplicate packets, however New Reno differs from RENO in that it doesn't exit fast-recovery until all the data which was outstanding at the time it entered fast recovery is acknowledged. Thus, New Reno is intended to overcome the problem faced by Reno of reducing the Congestion Window multiple times. The fast-transmit phase tends to be generally similar to that in Reno.

The system and method detailed herein are intended to initialize and implement TCP New Reno without manual configuration. In particular, as TCP New Reno has a plurality of parameters that are required to be initiated, manual configuration can be tedious and infective. The system and method detailed herein are intended to automate this procedure and monitor the congestion mechanism to provide for more optimized congestion management of TCP traffic flows.

The TCP New Reno congestion control mechanism includes 5 configurable parameters. The five parameters are as follows:

1) Initial Congestion Window (initial-cwnd) which provides for how many data packets are sent in an initial round-trip from a client to a server.
2) Maximum Congestion window (max-cwnd) defines a maximum size of the congestion window
3) SlowStart threshold 1 (ssthresh1) determines up to which level of the current congestion window (cwnd), the current cwnd is doubled. Once the current cwnd>sshtresh1, the cwnd will be incremented by 1 per round-trip, rather than doubled per round-trip.
(cwnd<sshtresh1=>exponential growth, cwnd>ssthresh1=>linear grows)
4) SlowStart threshold 2 (ssthresh2) is an exit threshold from Fast Retransmit into Fast Recovery.
5) SlowStart threshold 3 (ssthresh3) is similar to ssthresh1, in that it is a threshold to change from exponential growth to linear growth but is the threshold for this change after a timeout.

Figure 2:
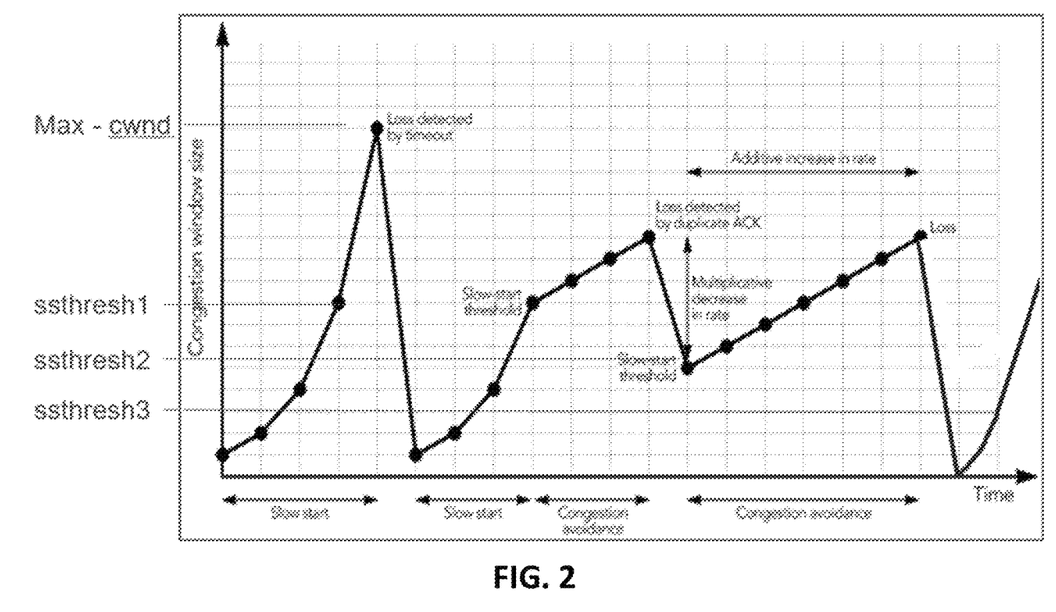
FIG. 2 illustrates a TCP traffic flow over time using a TCP congestion control mechanism.

Of the 5 parameters associated with TCP New Reno congestion mechanism, a key parameter is generally considered to be max-cwnd, the maximum size of the congestion window. In a steady-state, the max-cwnd value is used to decide the onset of congestion within the network. The flow over time of the traffic flow with the set parameters is illustrated in FIG. 2.

The bounds on these parameters are typically set manually between a set of minimum and maximum limits, based on the network access type. Manual configuration of parameters may be inaccurate as it is cumbersome and can lead to error. If the configuration is set inaccurately, the New Reno congestion control mechanism may not provide for reliable TCP congestion management.

In steady-state operation of New Reno, the "congestion window" (cwnd) decides the number of packets that are sent into flight in a single round-trip. This may be considered the number of packets sent into flight before waiting for an acknowledgement.

NewReno has 5 configurable parameters. The "maximum congestion window" (max cwnd) determines the maximum number of data packets sent into flight in a single round-trip. This parameter is used in the congestion avoidance state and is therefore the steady state operation when traffic behaviors are steady and congestion has not set in. It is considered to be beneficial to be in the congestion avoidance state most of the time as this allows the network to be used fully without leaving a significant amount of bandwidth unused. Hence, max-cwnd is an important parameter.

Other parameters are required for New Reno when the TCP traffic flow is in slow-start, fast retransmit and fast recovery mode. These parameters are to be used when congestion sets in due to traffic bursts. Ideally, if the congestion management is working well, these modes should rarely be entered into unless there is wildly fluctuating traffic volumes. As such the system and method are intended to set max-cwnd appropriately.

In particular, if the max-cwnd is not set appropriately, the performance of TCP-A (average throughput delivered) may be suboptimal. If the 'max-cwnd' is set too small or too low then the link bandwidth is underutilized and the user QoE is low because available link bandwidth is wasted. If the 'max-cwnd' is set too high, then the link will get congested very quickly resulting in poor QoE due to frequent changes between congestion avoidance and slow start. These changes will ultimately lower the throughput. If the New Reno congestion management mechanism is configured in this manner, it will enter slow start, too frequently which may result in rapid variations in QoE.

Embodiments of the system and method detailed herein are intended to configure the max-cwnd parameter periodically and automatically. Embodiments of the system and method are intended to provide for the link is used at its highest value without stressing the link to a point that causes unnecessary slow starts.

Figure 3:
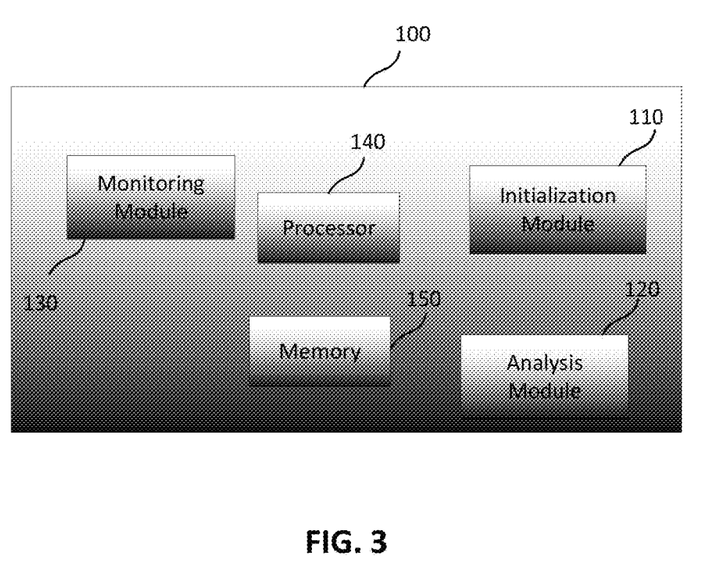
FIG. 3 is illustrates an embodiment of a system for calibration of TCP traffic flow acceleration.

FIG. 3 illustrates a system for calibration of TCP traffic flow acceleration. The system is intended to include an initialization module 110, an analysis module 120, a monitoring module 130, at least one processor 140 and at least one memory component 150. The system is generally intended to be distributed and reside in the data plane. A central processing unit or the control processor may be configured to execute the instructions stored in the memory component in order for the modules to execute their functions.

The initialization module 110 is configured to initialize the max congestion window parameter in order to start the congestion mechanism for the TCP traffic control. The initialization module 110 is intended to set or calibrate this parameter which will allow the other parameters to be automatically be set from this initial parameter.

The analysis module 120 is configured to determine the remaining parameters based on the maximum congestion window parameter and the traffic flow data as detailed herein.

The monitoring module 130 is configured to monitor the traffic flow and congestion mechanism to determine whether the traffic flow congestion control mechanism is properly functioning. The monitoring module 130 may also be configured to calibrate parameters on any update based on the monitoring of the traffic flow.

Figure 4:
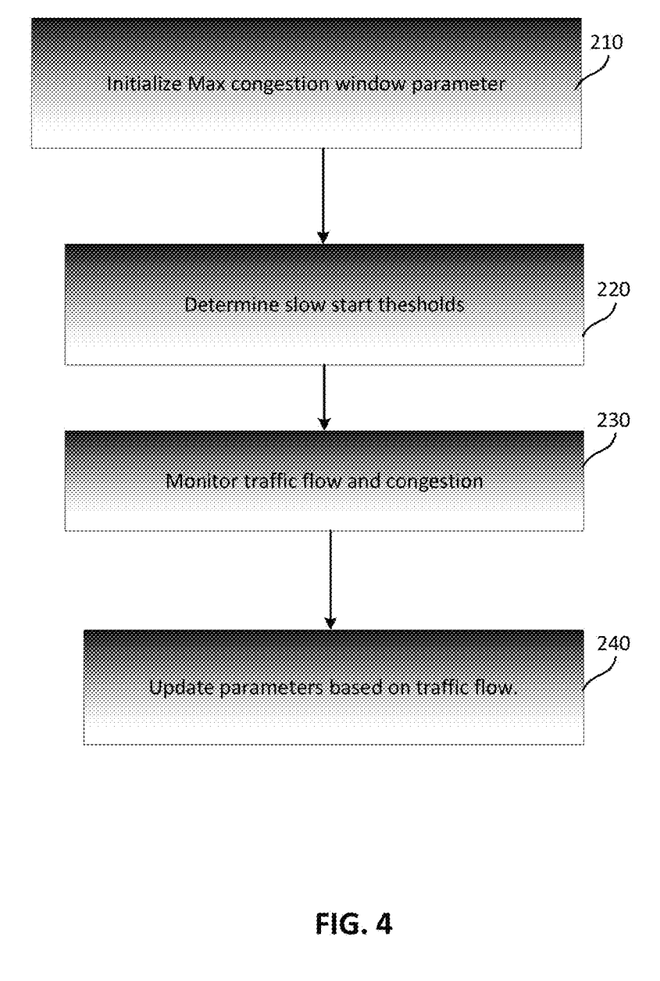
FIG. 4 illustrates a flow chart of a method for calibration of TCP traffic flow acceleration.

FIG. 4 illustrates an overview of the method 200 for calibration of TCP traffic flow acceleration. At 210, the initialization module is configured to initialize the maximum congestion window parameter as detailed herein. At 220, the analysis module 120 is configured to determine the slow start thresholds and any further parameters for the TCP congestion mechanism. The monitoring module 130, is configured to monitor the traffic flow and congestion to ensure that the traffic congestion mechanism is functioning properly, at 230. At 240, the system may update or calibrate any parameters in order to optimize the traffic flow and TCP congestion mechanism.

Figure 5:
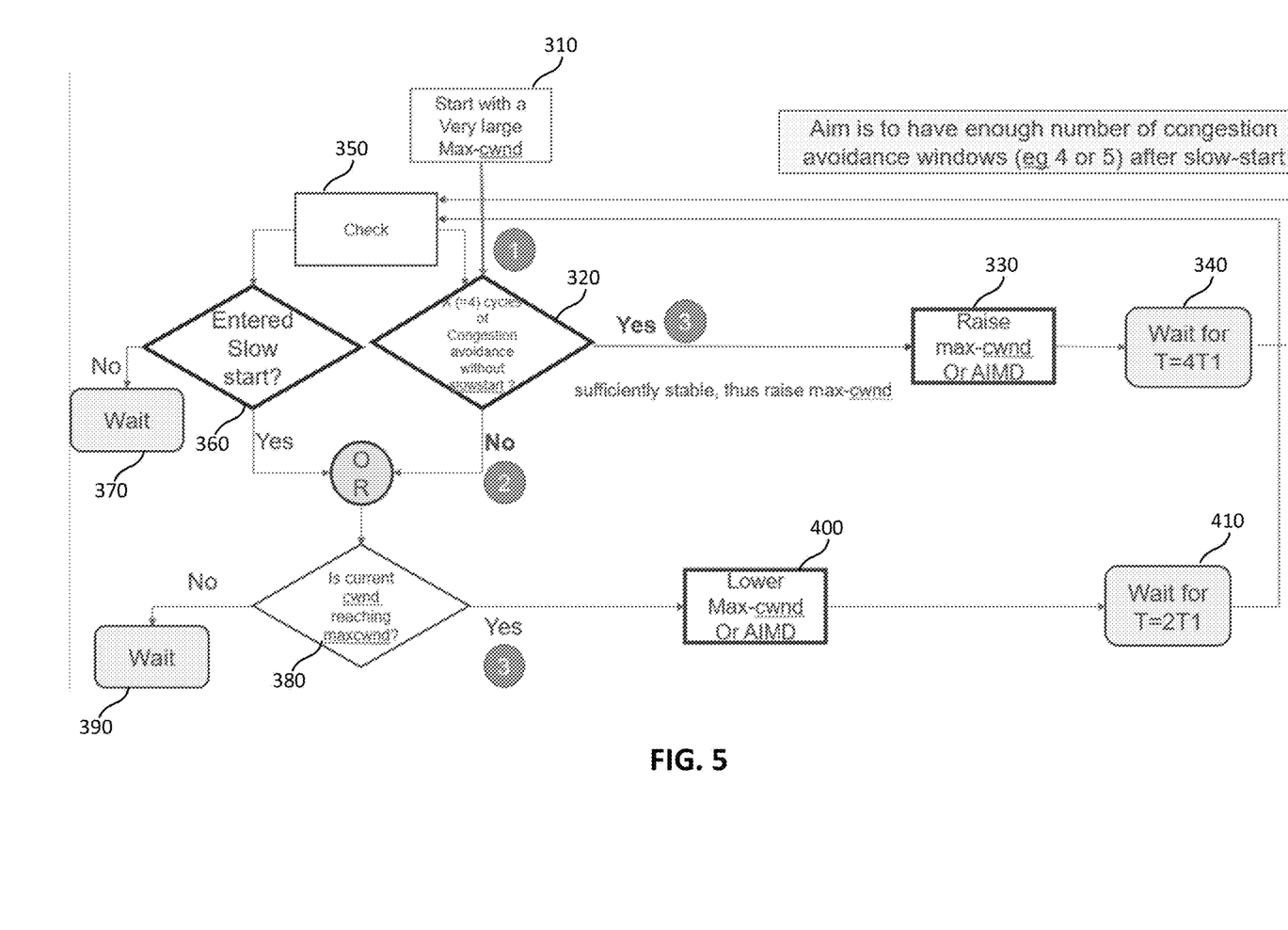
FIG. 5 is a flow chart for initializing the TOP congestion control according to an embodiment.

FIG. 5 illustrates a method 300 for automatic setting of max-cwnd parameter, via the initialization module, based on Round Trip Time (RTT) feedback. At 310, the system initializes with a large max-cwnd value. A counter in initialized by the initialization module to determine the congestion avoidance cycles, at 320. If the counter is equal to a predetermined configurable threshold, in this example 4. The system may determine the congestion control mechanism is sufficiently stable and may be able to raise the Max-cwnd threshold, at 330. In some cases, raising the Max-cwnd may be done in an Additive Increase Multiplicative Decrease (AIMD) manner. The system is then configured to wait a longer threshold period, at 340.

At 350, the system reviews the threshold and counter to determine whether the traffic flows have entered into a cycle of congestions avoidance or entered into a slow start, at 360. If it has not, the system may be configured to wait, at 370 to continue monitoring the traffic. If the traffic has entered the predetermined number to congestion avoidance threshold cycles, the system may be configured to repeat the increase to Max-cwnd. Otherwise, if the traffic flow has entered slow start or the number of congestions cycles was not reached without a slow start, the initialization module may determine whether the current congestion window is reaching the max-cwnd threshold at 380.

If the current congestion window is not reaching the max-cwnd, the system may be configured to wait and monitor the traffic flow a longer time, at 390.

If the current congestion window is reaching the max-cwnd, the initialization module is configured to lower the max-cwnd, at 400. In some cases, it may be lowered in an AIMD manner. Once it has been lowered, the system may continue to monitor the traffic and the congestion avoidance cycles.

It is intended that the threshold for congestion avoidance cycles is set to a predetermined number. It is intended that this threshold be enough cycles to review the congestion window, but not so many that the max-cwnd is never updated. It may be preferable to have the threshold between 2 and 10 cycles or even between 4 or 5 cycles.

Embodiment of the system and method are intended to not require RTT awareness per technology. Optionally, instead of average RTT, the user Score for a given application category, for example, Streaming Video, Gaming, Downloading, or the like, can be used to represent a parameter that quantifies the user QoE. Alternate metrics include user Score across multiple categories, or other parameters that represent QoE.

Embodiments of the system and method are intended to change or modify the max-cwnd parameter at a slow rate. A slow rate is generally preferred as it is intended to allow the TCP operation to continue without being interfered. Hence the periodicity of the timer settings, to decide changes to the max-cwnd parameter, is intended to be preconfigured to a fairly long time. The periodicity of the timer depends on the traffic dynamics in the network. It should be sufficiently fast to permit optimal TCP-A operation, without being so fast as to interfere with the eNB (evolution Node B) scheduler operation. In many instances, the time is in the order of several minutes for example in the order of five to ten minutes although other timing may be used.

Once an initial max-cwnd parameter has been determined by the initialization module, the slow start threshold may be set by the analysis module. In particular, the slow start threshold 1 (Ssthresh1) tends to be considered more key to the TCP congestion mechanism and should be assess carefully. The analysis module is intended to set the Ssthresh1 as a multiple of the max-cwnd:

$$Ssthres1 = k * maxcwnd$$

The analysis module 120 may be configured to vary the factor k slowly, for example over several minutes to half an hour to an hour. It is intended to be varied at a rate that is slower that the rate at which max-cwnd changes. The monitoring module may examine aggregate throughput over long time periods combined with user scores and the number of congestion avoidance instances for every (steady-state) congestion avoidance instance. This detail is intended to be used to determine whether the slow start threshold appears to be at the appropriate level. Once the ssthresh1 is set, then ssthresh1 and 3 can be derived as a percentage of ssthresh1. In some cases, the range of k would vary between 0.4 to 0.8 of ssthresh1. Ssthres2 could vary between 0.7 to 0.9 of ssthres1. Ssthres3 could vary between 0.7 to 0.9 of ssthres2. Other ranges may be selected but it is intended that each ssthresold is based on the other ssthreshold and the various other congestions monitoring of the network.

Embodiments of the system and method are intended to reduce the number of slow starts when the network is using the New Reno congestion control mechanism. This is intended to provide for overall better QoE for subscribers, as slow starts tend to impact subscribers' use of the network. Further, it is intended to provide for high link capacity, which allows the network operator to maximize the use of the network.

Figure 6A:
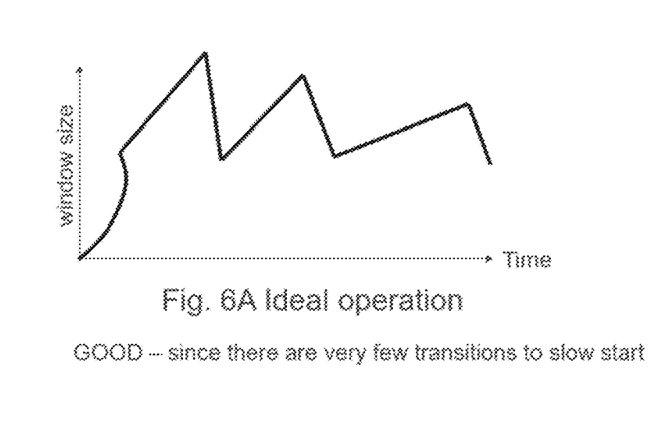
FIGS. 6A to 6E illustrate various TCP traffic flows over time.
Figure 6B:
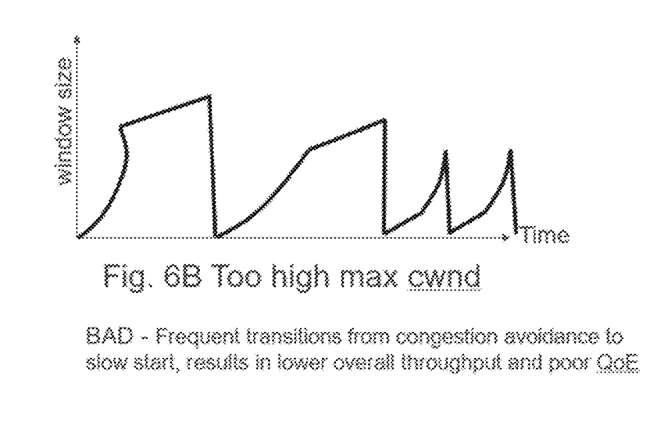

FIGS. 6A to 6E provide example traffic flows under the congestion mechanism over time. FIG. 6A is intended to show the outcome from the use of the system and method detailed herein. The flow can be seen to go through congestion cycles without frequent transitions or slow starts. This is intended to provide the best use of the network with the highest QoE to the subscriber.

Figure 6C:
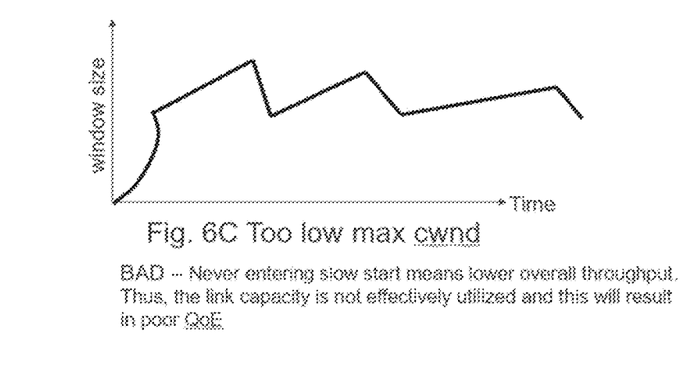

FIGS. 6B to 6E illustrate less than ideal use of TCP congestion control mechanism. From FIG. 6B it can be seen that with frequent slow starts the throughput is significantly lower thus resulting in a reduced QoE. This may occur when the max cwnd is sent too high. FIG. 6C on the other hand never enters slow start and also has a lower throughput but underutilizing the network resources and not managing link capacity effectively. This can occur when the max-cwnd is set too small. Lower overall throughput will reduce the subscribers overall QoE.

Figure 6D:
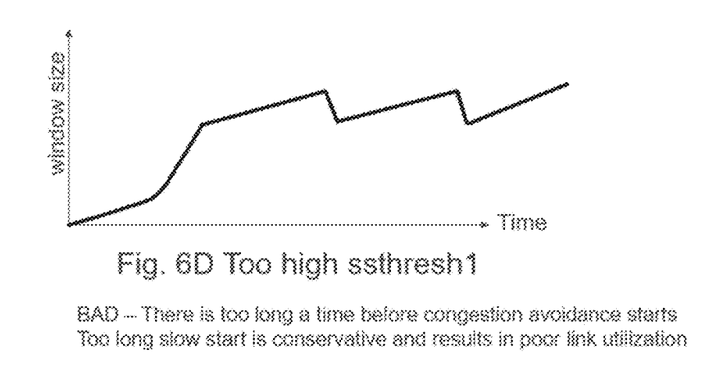
Figure 6E:
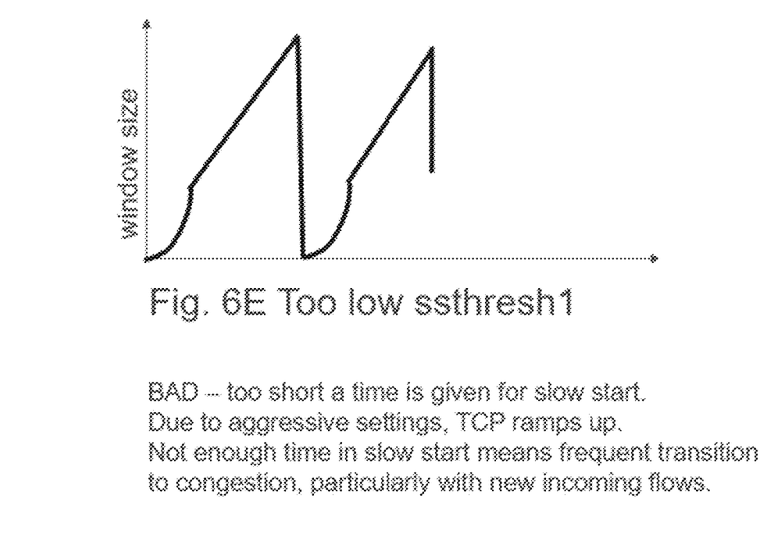

FIGS. 6D and 6E illustrate issues when the ssthresh1 is not set appropriately. In FIG. 6D, as the ssthres1 is sent to high there is a long time of congestion avoidance, and it may poor link utilization. Also, if the ssthres1 is too low, then there may be too short a slow start as the TCP ramps up. As shown in FIG. 6E, the frequent transitions which would occur particularly for new incoming flows, would reduce the QoE for the subscribers. The set of the new Reno parameters in an automated way is intended to prevent the conditions of underutilizing the links or over utilizing the links.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for calibration of Transmission Control Protocol (TCP) traffic flow acceleration in a computer network, the method comprising:
   initializing a maximum congestion window parameter;
   determining at least one slow start threshold as a multiple of the maximum congestion window parameter;
   monitoring congestion of the traffic flows within the network; and
   calibrating the maximum congestion window parameter based on the monitored congestion of the traffic flows and the at least one slow start threshold based on the maximum congestion window parameter; and
   determining whether an update to the at least one slow start threshold is required by monitoring throughput or the computer network combined with user scores and a number of congestion avoidance instances.

2. The method according to claim 1 wherein monitoring the traffic flow within the network comprises:
   creating a counter to determine a number of cycles of congestion avoidance; and
   determining the number of cycles of congestion avoidance without entering a slow start phase of congestion avoidance.

3. The method according to claim 2 wherein the maximum congestion window parameter is raised once the number of cycles of congestion avoidance has hit a predetermined cycle threshold.

4. The method according to claim 1 wherein monitoring the traffic flow within the network comprises:
   determining whether the traffic flow has entered into a slow start phase; and
   lowering the maximum congestion window parameter.

5. The method according to claim 1 wherein the maximum congestion window parameter is initialized as a high initial value in comparison with an associated link bandwidth.

6. The method according to claim 1 wherein three slow start thresholds are determined.

7. The method according to claim 6 wherein the first slow start threshold is initialized as a multiple of between 0.4 and 0.6 of the maximum congestion window parameter.

8. The method according to claim 6 wherein the second and third slow start thresholds are multiples of between 0.7 and 0.9 of the previous slow start threshold.

9. The method according to claim 1 wherein once at least one maximum congestion window parameter or the at least one slow start threshold is updated, each of the at least one other of the maximum congestion window parameter and the at least one slow start threshold is updated based on the update.

10. A system for calibration of Transmission Control Protocol (TCP) traffic flow acceleration in a computer network, the system comprising at least one processor configured to execute instructions stored in a memory component wherein the instructions provide for modules comprising:

an initialization module configured to initialize a maximum congestion window parameter;

an analysis module configured to determine at least one slow start threshold as a multiple of the maximum congestion window parameter; and a monitoring module configured to monitor congestion of the traffic flows within the network, calibrate the maximum congestion window parameter based on the congestion of the monitored traffic flows and the at least one slow start threshold based on the maximum congestion window parameter, and determine whether an update to the at least one slow start threshold is required by monitoring throughput or the computer network combined with user scores and a number of congestion avoidance instances.

11. The system according to claim 10 wherein the monitoring module is configured to:

create a counter to determine a number of cycles of congestion avoidance; and determine the number of cycles of congestion avoidance without entering a slow start phase of congestion avoidance.

12. The system according to claim 11 wherein the maximum congestion window parameter is raised once the number of cycles of congestion avoidance has hit a predetermined cycle threshold.

13. The system according to claim 10 wherein the monitoring module is configured to:

determine whether the traffic flow has entered into a slow start phase; and lower the maximum congestion window parameter.

14. The system according to claim 10 wherein the initialization module is configured to initialize the maximum congestion window as a high initial value in comparison with an associated link bandwidth.

15. The system according to claim 10 wherein the analysis module is configured to determine three slow start thresholds.

16. The system according to claim 15 wherein the first slow start threshold is initialized as a multiple of between 0.4 and 0.6 of the maximum congestion window parameter.

17. The system according to claim 15 wherein the second and the third slow start thresholds multiples of between 0.7 and 0.9 of the slow start threshold.

18. The system according to claim 10 wherein the monitoring module is configured to update at least one other of the maximum congestion window parameter and the at least one slow start threshold once at least maximum congestion window parameter or the at least one slow start threshold is updated.

\* \* \* \* \*